(12) United States Patent
Warton et al.

(10) Patent No.: US 8,312,468 B2
(45) Date of Patent: Nov. 13, 2012

(54) METHODS AND APPARATUS FOR FAST CONTEXT SWITCHING IN A VIRTUALIZED SYSTEM

(75) Inventors: Matthew John Warton, Rockdale (AU); Carl Frans VanSchaik, Randwick (AU)

(73) Assignee: Open Kernel Labs, Chicago, IL (US)

( * ) Notice: Subject to any disclaimer, the term of this patent is extended or adjusted under 35 U.S.C. 154(b) by 586 days.

(21) Appl. No.: 12/481,374

(22) Filed: Jun. 9, 2009

(65) Prior Publication Data

US 2010/0313201 A1      Dec. 9, 2010

(51) Int. Cl.
G06F 9/46      (2006.01)
G06F 9/455     (2006.01)
G06F 9/26      (2006.01)

(52) U.S. Cl. ........ 718/108; 718/107; 718/102; 711/206; 711/203; 711/201

(58) Field of Classification Search ........................ None
See application file for complete search history.

(56) References Cited

U.S. PATENT DOCUMENTS

| | | | |
|---|---|---|---|
| 6,076,141 A | 6/2000 | Tremblay | |
| 6,233,668 B1 * | 5/2001 | Harvey et al. | 711/206 |
| 7,409,487 B1 | 8/2008 | Chen et al. | |
| 2006/0259732 A1 | 11/2006 | Traut | |
| 2006/0282461 A1 | 12/2006 | Marinescu | |
| 2009/0327648 A1 | 12/2009 | Savagaonkar et al. | |
| 2010/0162235 A1 | 6/2010 | Ginzton et al. | |

OTHER PUBLICATIONS

International Search Report and Written Opinion for International Application PCT/US10/37372 dated Jul. 28, 2010.
Notification Concerning Transmittal of International Preliminary Report on Patentability mailed Dec. 22, 2011 with International Search Report for International Application No. PCT/US/10/37372 mailed Jul. 28, 2010.

* cited by examiner

*Primary Examiner* — Meng An
*Assistant Examiner* — Bing Zhao
(74) *Attorney, Agent, or Firm* — Faegre Baker Daniels LLP

(57) ABSTRACT

The present disclosure provides methods and apparatus for fast context switching in a virtualized system. In the disclosed system, a globally unique application-space identifier is associated with each guest application. No two applications share the same application-space identifier, even if the two applications reside in different virtual machines. Domain identifiers are used to ensure that a guest's mappings are only active when that guest is executing. A unique domain identifier is associated with each virtual machine, and all translation lookaside buffer entries thereby mapping the guest's kernel pages with that domain value. All other mappings are tagged with a predefined domain such as zero. In addition, a virtual memory management unit may be configured to support two virtual page table pointers and a configurable boundary between a virtual user page table and a virtual kernel page table. In such an instance, the two virtual page table pointers are presented to a guest operating system, and two physical page table pointers are associated with the two virtual page table pointers.

30 Claims, 13 Drawing Sheets

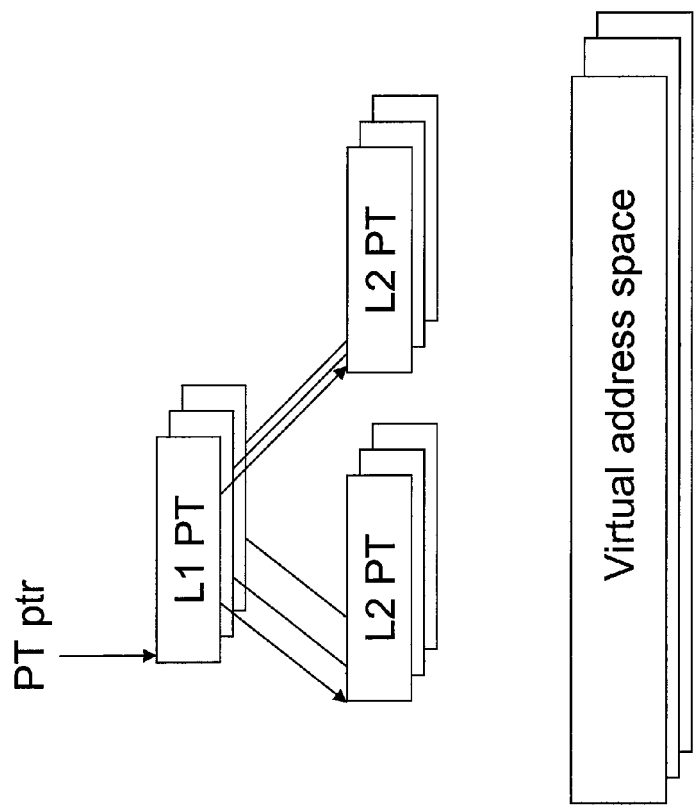

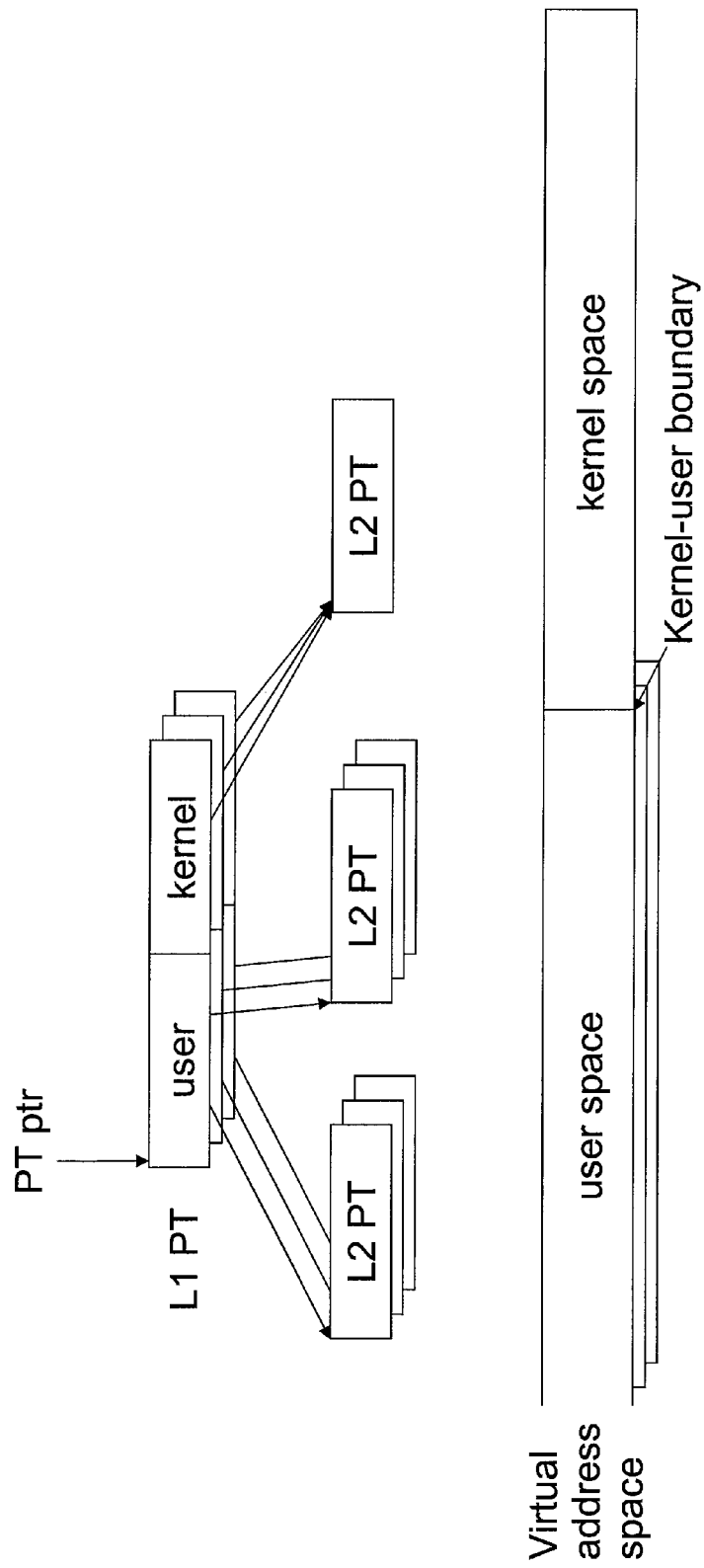

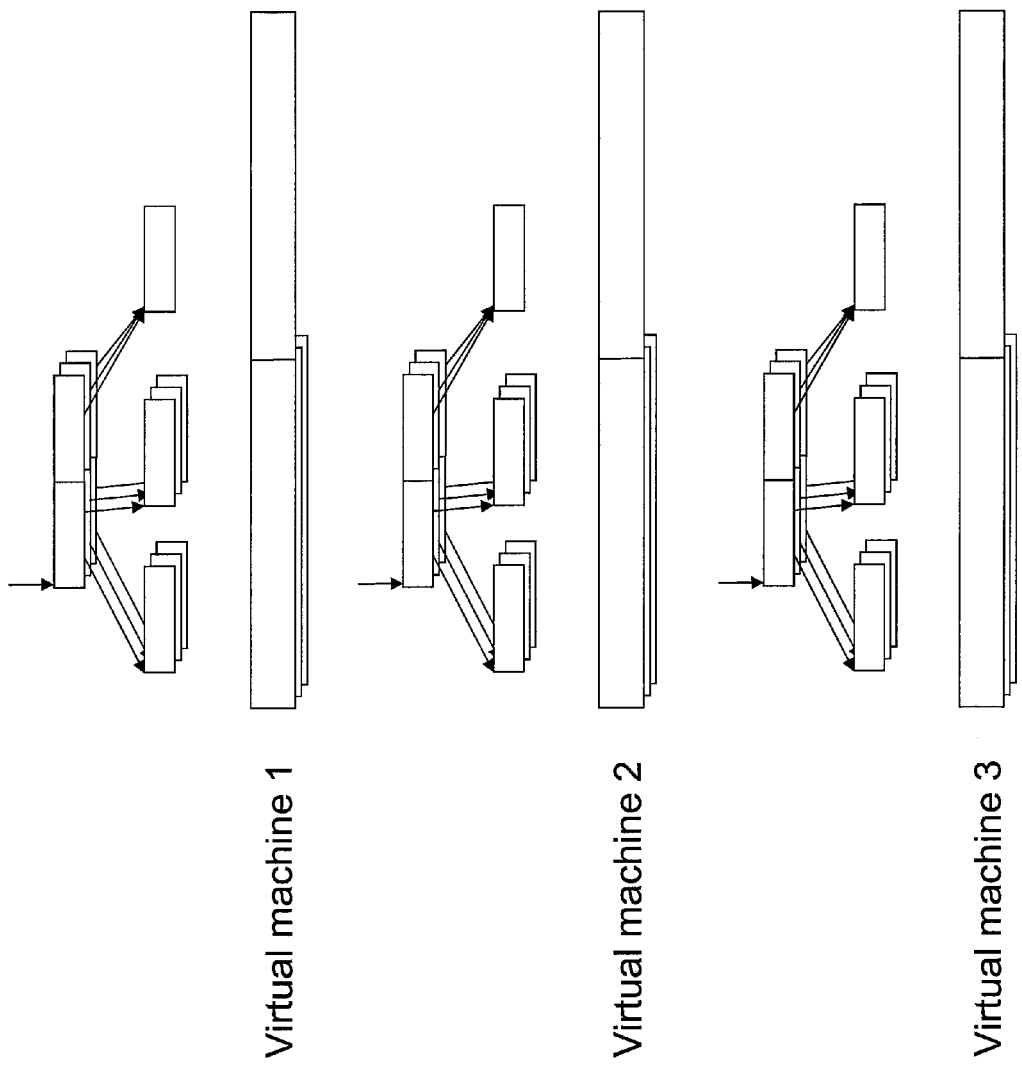
Fig 3: Page Tables for Multiple VMs

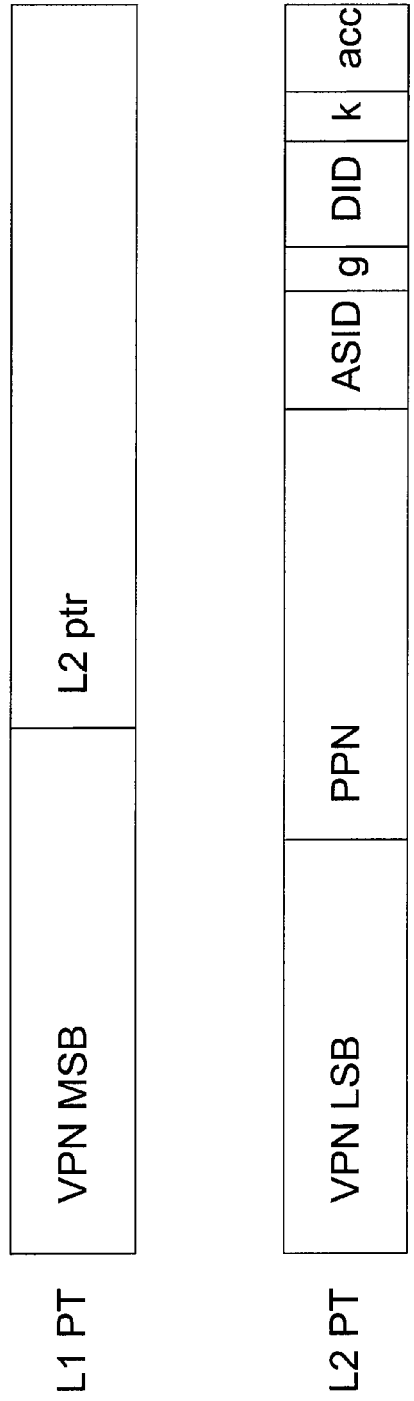
Fig 4: Simplified (logical) view of ARMv6 PT Entries
VPN MSB: most significant bits of virtual page number
VPN LSB: least significant bits of virtual page number
L2 ptr: pointer to L2 (leaf) page table
PPN: physical page number
ASID: application-space ID
g: global bit
DID: domain ID
k: kernel-only access
acc: access rights

Fig 5: DACR (simplified)

| D15 | D14 | D13 | D12 | D11 | D10 | D9 | D8 | D7 | D6 | D5 | D4 | D3 | D2 | D1 | D0 |
|-----|-----|-----|-----|-----|-----|----|----|----|----|----|----|----|----|----|----|

Di: Indicates whether TLB entries tagged with domain i are active

In the example below, entries tagged with domains 0 or 2 are (potentially) active (entries 0, 1, 2, 4, 5), all others are inactive

| TLBE | VPN | PPN | ASID | g | DID | k | acc |
|------|-----|-----|------|---|-----|---|-----|
| 0    |     |     |      |   | 0   |   |     |
| 1    |     |     |      |   | 2   |   |     |
| 2    |     |     |      |   | 1   |   |     |
| 3    |     |     |      |   | 8   |   |     |
| 4    |     |     |      |   | 0   |   |     |
| 5    |     |     |      |   | 2   |   |     |
| 6    |     |     |      |   | 1   |   |     |
| 7    |     |     |      |   | 4   |   |     |

DACR  | 0 0 0 0 0 0 0 0 0 0 0 0 0 1 0 1 |

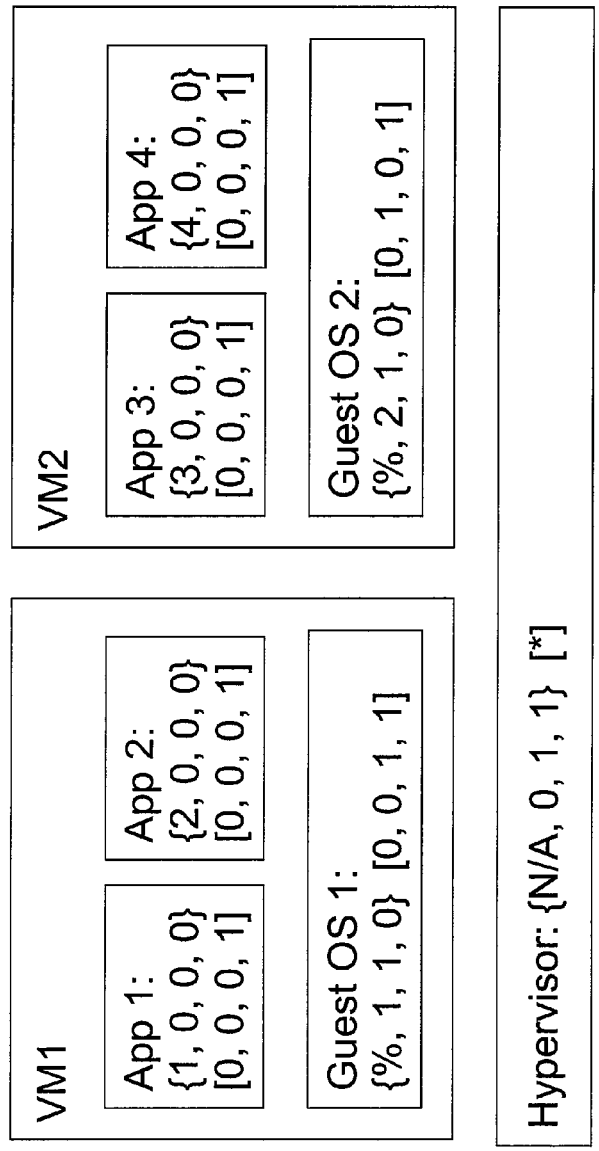

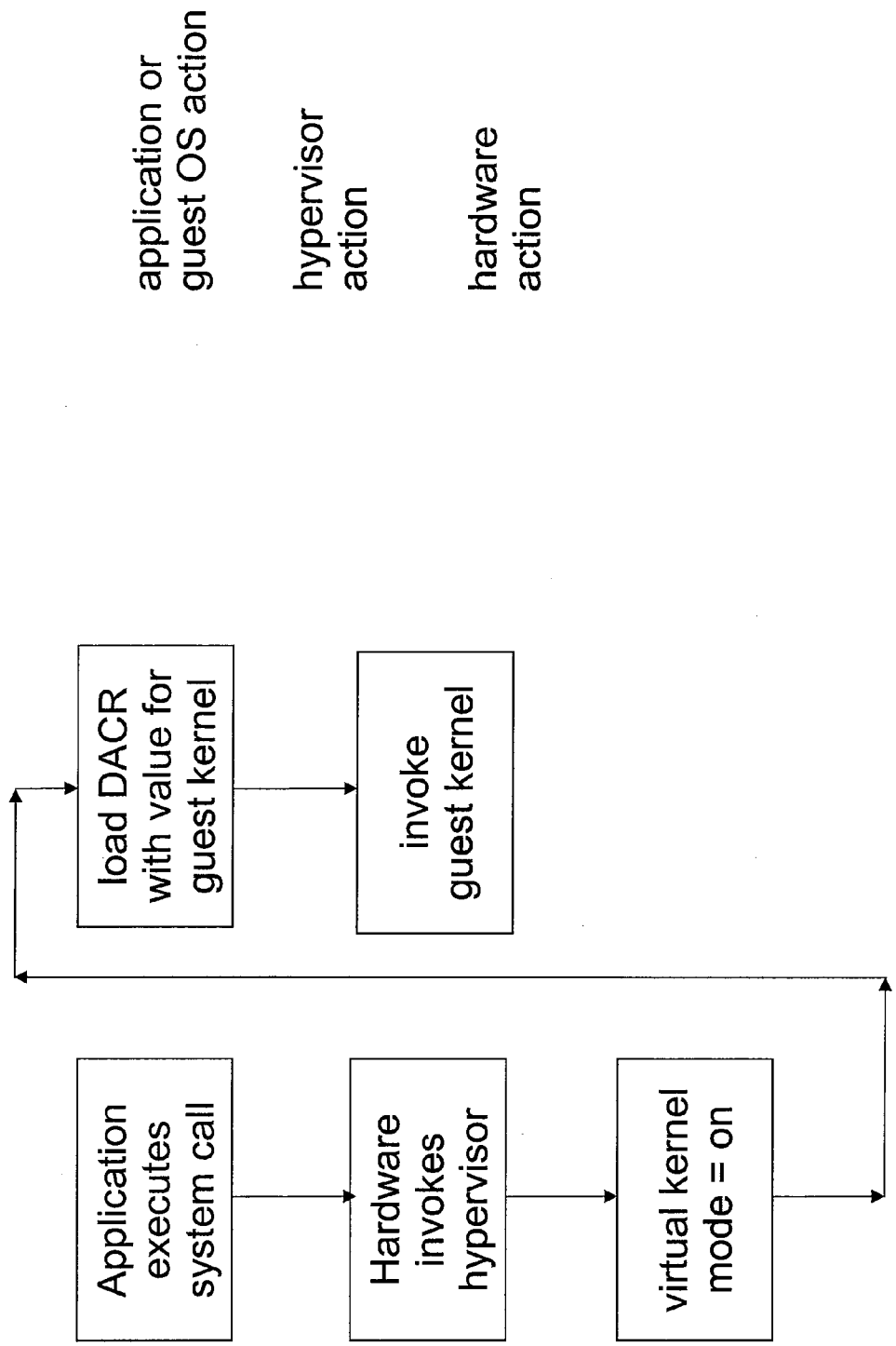

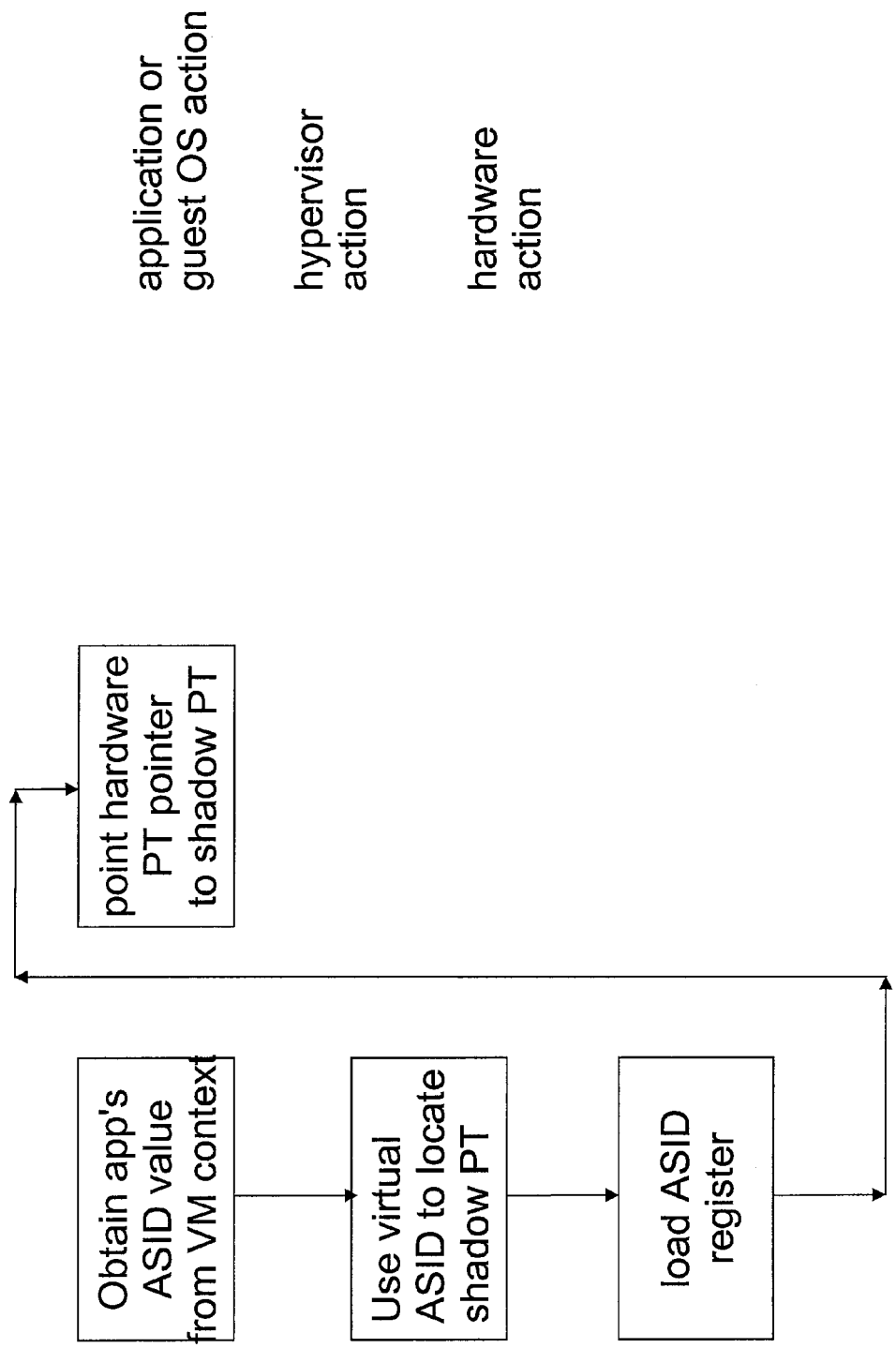

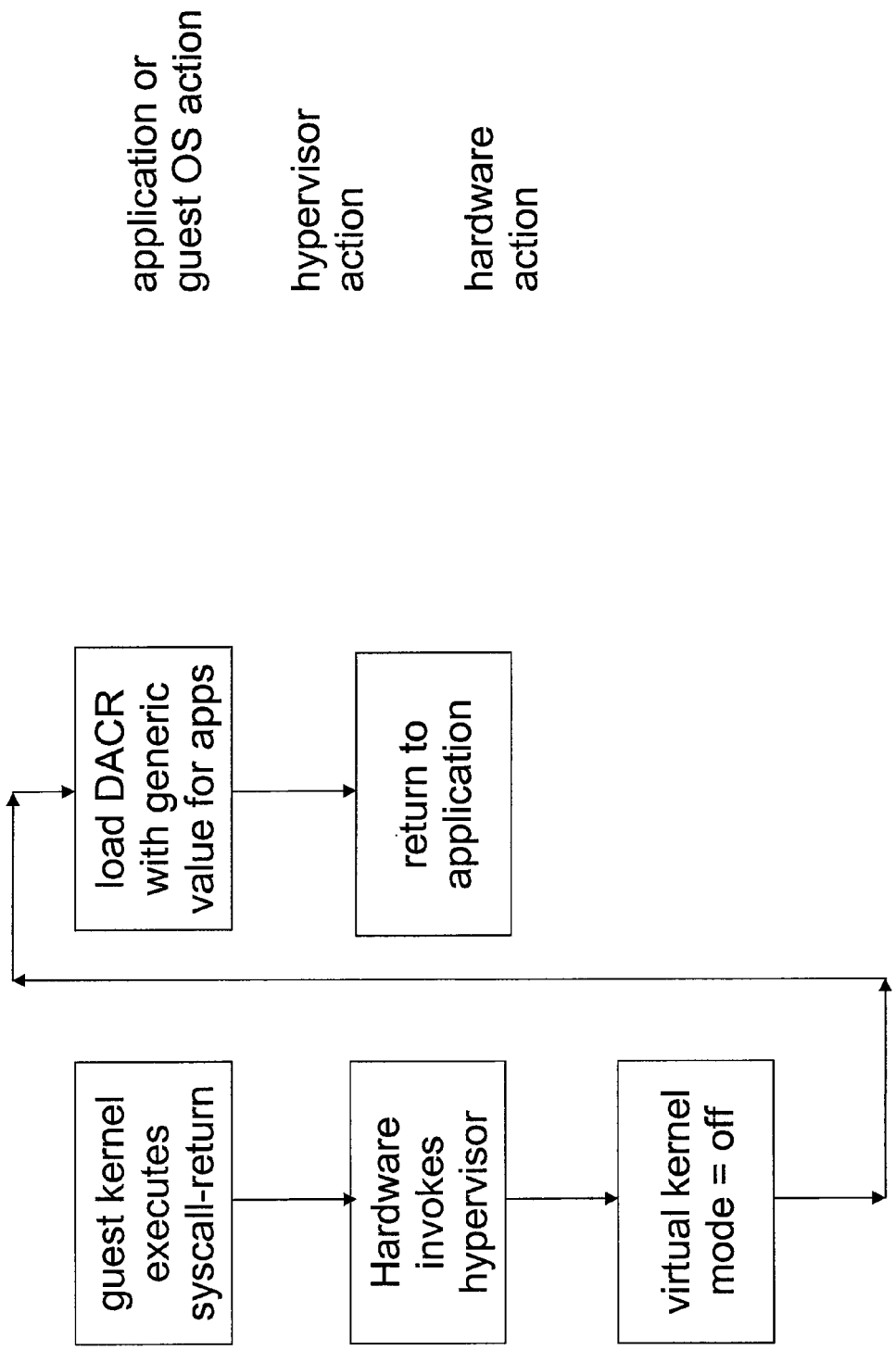
Fig 9: Guest kernel exit

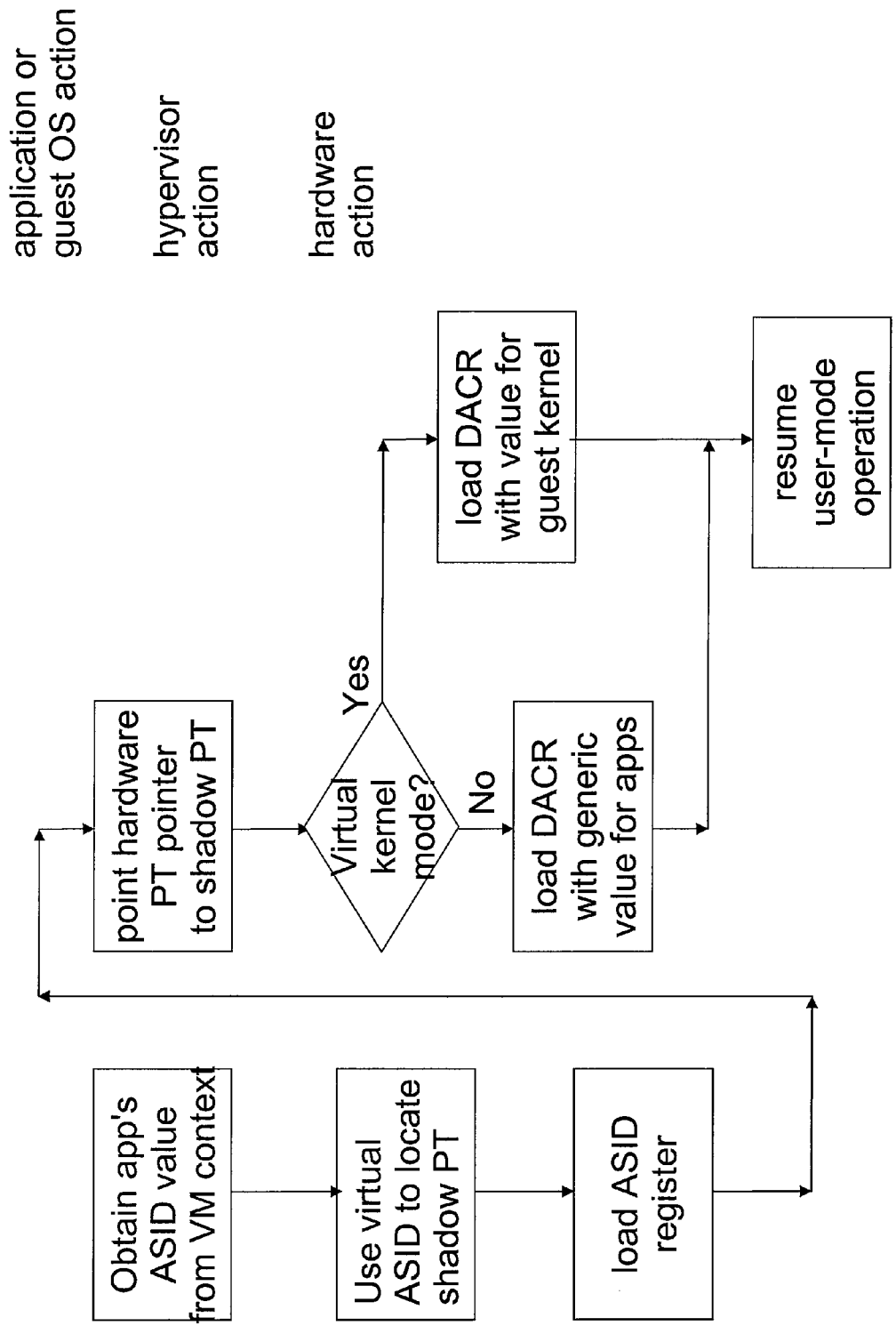
Fig 10: World switch

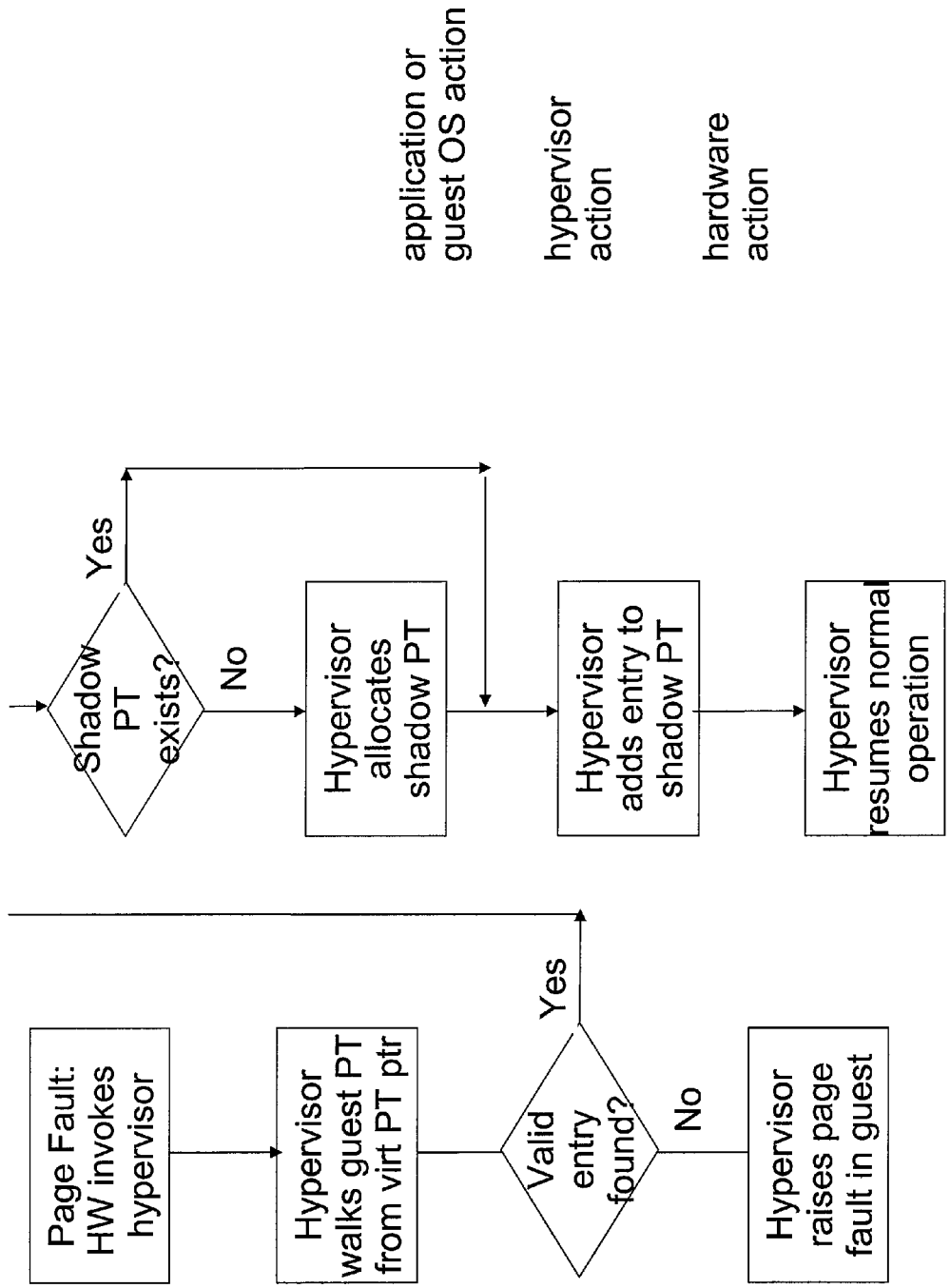

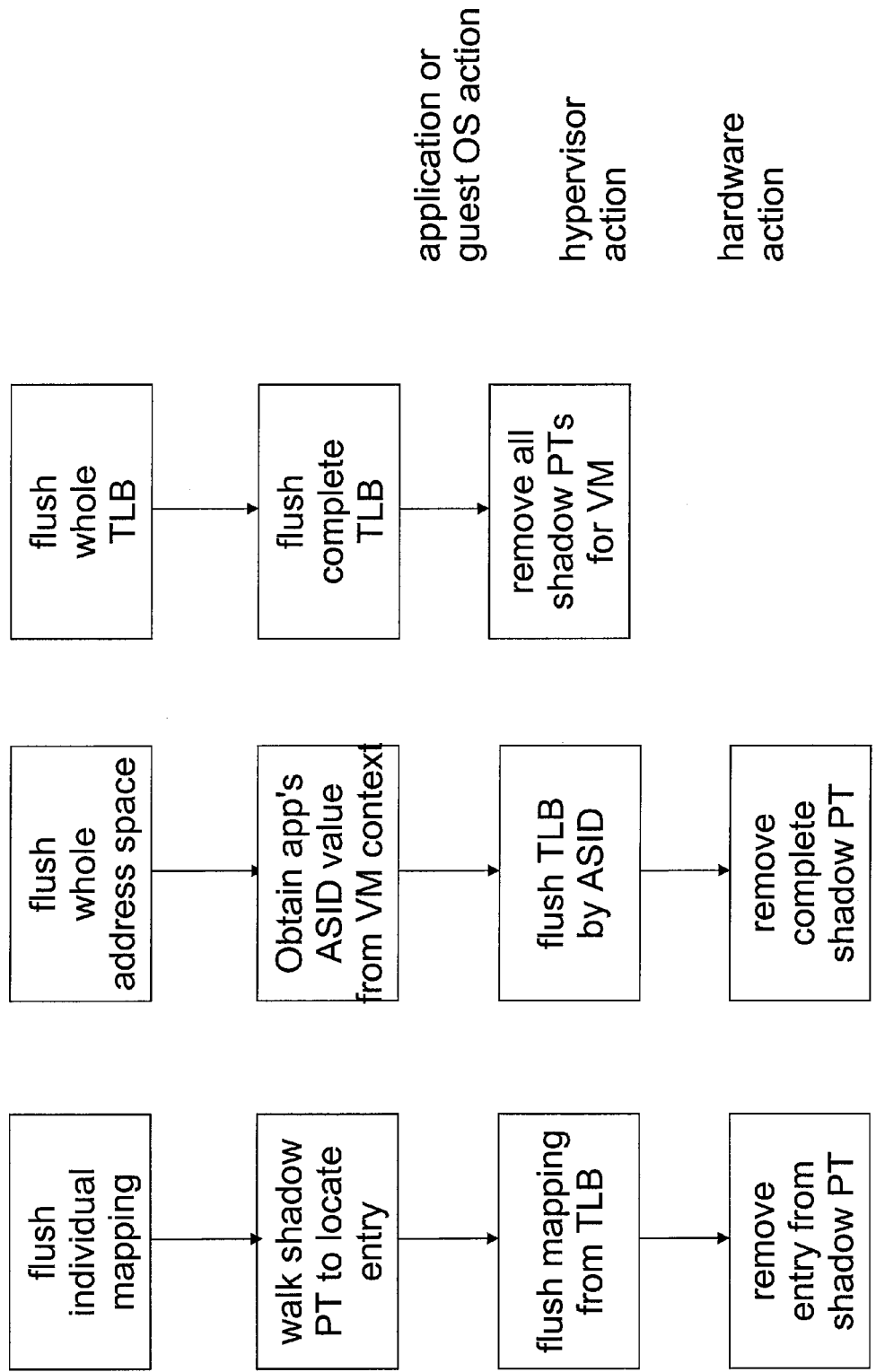

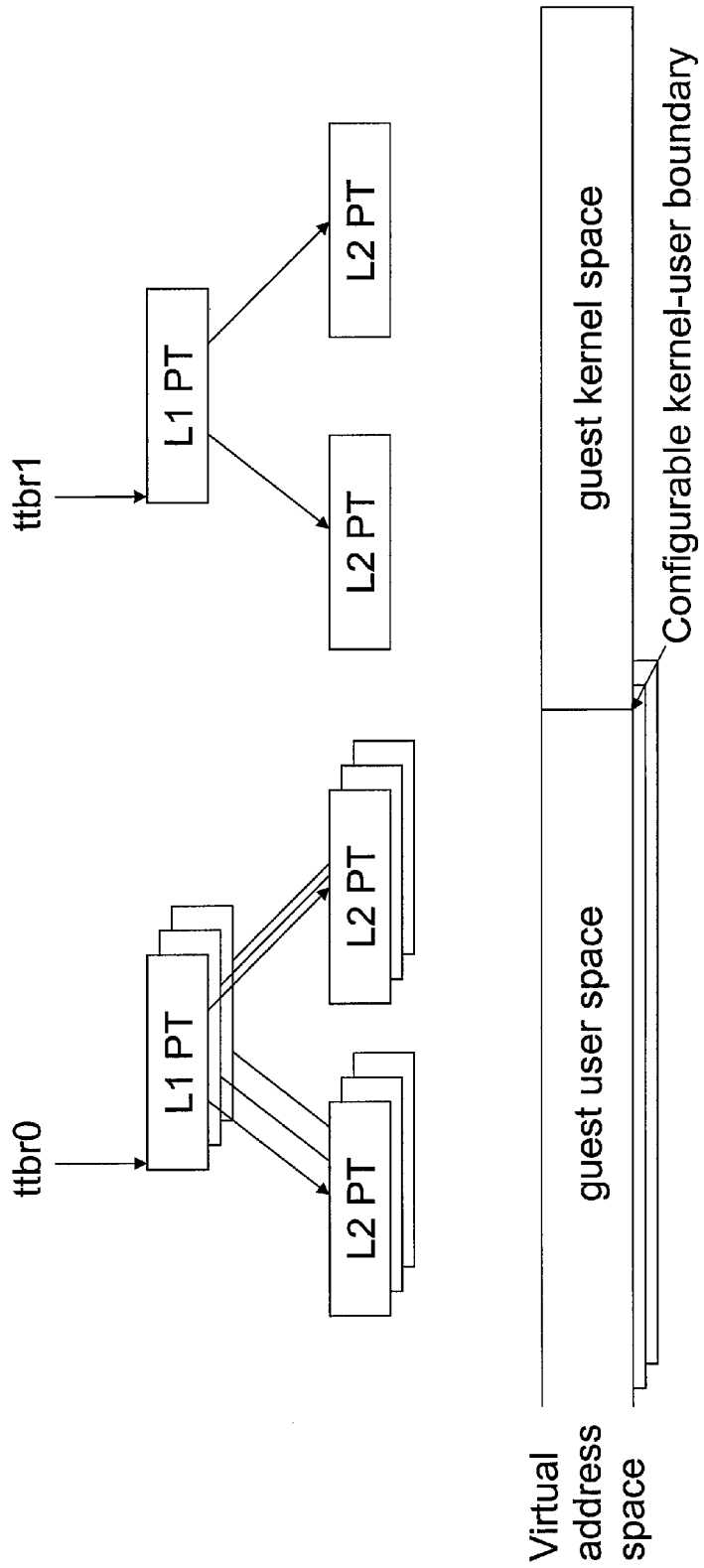
Fig 13: Partitioned Page Tables

METHODS AND APPARATUS FOR FAST CONTEXT SWITCHING IN A VIRTUALIZED SYSTEM

TECHNICAL FIELD

The present application relates in general to virtual machines and more specifically to methods and apparatus for fast context switching in a virtualized system.

BACKGROUND

Some microprocessors, such as microprocessors using the ARM architecture, include a privileged (or kernel) mode and an unprivileged (or user) mode of execution. The privileged/kernel mode is typically reserved for a single operating system (OS).

Programs being executed by one of these processors, such as applications and the operating system, typically access memory using virtual addresses. A memory-management unit (MMU) translates these virtual addresses in to physical addresses.

As illustrated in FIG. 1, each running application has a separate page table (PT) that maps virtual memory for that application to physical memory for that application. Typically, the OS is allocated a high portion of the virtual address space, with memory mappings that are only active when the processor is in kernel mode. The OS typically has access to its own memory mapping as well as each application's memory mapping. This allows the OS to access data in each application's memory. In contrast, each application typically only has access to its own memory mappings and its own memory.

In many non-virtualized systems, the change between allowing access to all of the memory and only some of the memory happens automatically when the processor mode changes between kernel mode and user mode. Each page table entry is tagged with a kernel bit to indicate whether the memory mapping is always valid or only valid in kernel mode.

Page tables reside in regular memory. In order to use a page table entry, that entry must be brought in to a register in the processor called the translation lookaside buffer (TLB). The TLB is a limited-size cache of page-table entries (PTEs). Because the TLB is so small (typically less than 100 entries), TLB real estate is valuable.

When the TLB contains no mapping for an attempted memory access, some processors (e.g., ARM) traverse ("walk") the appropriate page table to locate a suitable mapping. This is a time consuming process that degrades processor performance. If a suitable memory mapping is located, the page table walker inserts the memory mapping into the TLB. This removes a previous memory mapping from the TLB. Hence, reducing the number of TLB entries needed improves processor performance.

The MMU includes the TLB, the page-table walker, a page-table pointer register, and other control registers explained in more detail below. Because the MMU automatically walks the page tables, the processor architecture dictates a format for the associated page tables.

Because there is only one kernel (one operating system) in a non-virtualized system, all kernel mappings are independent of which application is executing. While each application has its own page table, this means that second-level (L2) page tables that contain only kernel mappings may be shared between different applications' page tables. This is achieved by having the parts of all applications' L1 page tables that correspond to the kernel part of the address space point to the same L2 page tables, as illustrated in FIG. 2. Furthermore, kernel entries are marked as global, which ensures that only one entry will ever be in the TLB for each kernel mapping, thus reducing pressure on TLB real-estate. A person of ordinary skill in the art will readily appreciate that other kernel mappings may be used without departing from the scope or spirit of the disclosed system.

However, in a virtualized system, there are typically multiple kernels (multiple operating systems). As a result, fast context switching using these traditional memory mapping schemes becomes problematic.

SUMMARY

The present disclosure provides improved methods and apparatus for fast context switching in a virtualized system. In the example system disclosed, a globally unique application-space identifier is associated with each guest application. No two applications share the same application-space identifier, even if the two applications reside in different virtual machines. Domain identifiers are used to ensure that a guest OS's mappings are only active when that guest is executing. A unique domain identifier is associated with each virtual machine, and all translation lookaside buffer entries thereby mapping the guest's kernel pages with that domain value. All other mappings are tagged with a predefined domain such as zero. In addition, a virtual memory management unit may be configured to support two virtual page table pointers and a configurable boundary between a virtual user page table and a virtual kernel page table. In such an instance, the two virtual page table pointers are presented to a guest operating system, and two physical page table pointers are associated with the two virtual page table pointers.

BRIEF DESCRIPTION OF THE FIGURES

FIG. 1 is a block diagram showing one example of how each running application has a separate page table that maps virtual memory for that application to physical memory for that application.

FIG. 2 is a block diagram showing one example of how having the parts of all applications' L1 page tables that correspond to the kernel part of the address space point to the same L2 page tables.

FIG. 3 is a block diagram showing an example of various address spaces and page tables.

FIG. 4 is a block diagram showing a simplified view of ARMv6 page table entries.

FIG. 5 is a block diagram showing a simplified example of the effect of the domain access control register.

FIG. 6 is a block diagram showing one example of how various tags are assigned and the pre-computed domain access control register value associated with each shadow page table.

FIG. 7 is a flowchart showing one example of how the hypervisor changes the domain access control register thereby enabling a particular virtual machine's domain in addition to a global domain.

FIG. 8 is a flowchart showing one example of how the hypervisor virtualizes and updates a application-space identification register with a value corresponding to a target application.

FIG. 9 is a flowchart showing one example of how a guest kernel returns to user mode and the hypervisor resets the domain access control register to only having the global domain enabled.

FIG. 10 is a flowchart showing one example of a world switch.

FIG. 11 is a flowchart showing one example of page fault handling and shadow page table construction.

FIG. 12 is a flowchart showing examples of flush operations.

FIG. 13 is a block diagram showing one example of dual page table pointers.

DETAILED DESCRIPTION

In a virtualized system, a hypervisor multiplexes hardware between multiple virtual machines (VMs), and presents each VM with the illusion of being a complete system. In this case, only the hypervisor has privileged access to all of the memory. The hypervisor provides a virtual kernel mode for multiple virtualized operating systems running on the single processor.

FIG. 3 illustrates an example of various address spaces and page tables. In this example, there are multiple VMs. Each VM includes multiple applications, and each application has its own page table. The application page table that is active for each VM is determined by that VM's OS pointing a virtual page-table pointer at the active page table.

The page tables maintained by the guest OS map addresses from the virtual address space as seen by the guest application or OS (called guest virtual addresses) to what the guest experiences as physical memory (guest physical address space). The hypervisor translates these guest physical addresses to real physical addresses.

The hypervisor preferably maintains a shadow page table, which is constructed from the guest OS's page table by translating the guest physical addresses (contained in the guest page tables) into real physical addresses. The page table pointer for each virtual OS is virtualized by the hypervisor pointing the physical page table pointer at the appropriate shadow page table.

FIG. 4 illustrates a simplified view of ARMv6 page table entries (PTEs). The domain ID, which tags mappings and therefore logically belongs into the L2 PT, is stored in the L1 PT.

The MMU includes an application-space ID (ASID) register. TLB entries are tagged with a particular ASID value, and are only active if that tag matches the content of the processor's ASID register. TLB entries can also be marked global. Global TLB entries are active irrespective of the value of the ASID register. Typically, a small number of different ASID values are supported (e.g., 128-256).

The MMU also includes a domain access control register (DACR). A TLB entry is also tagged with a domain ID, and the DACR specifies for each domain whether TLB entries tagged with that domain ID are presently active. Only a relatively small number of domains are supported (e.g., 16). The effect of the DACR is illustrated in FIG. 5.

In order increase performance, it is desirable to switch quickly between different virtual machines (world switch) within the processor, switch quickly between virtual user mode and virtual kernel mode within each VM, switch quickly between applications within each VM, and enable each virtual OS to have fast access to the memory of its applications. Because the virtualized kernel is executing in user mode, just like applications, the kernel-bit in the page table cannot be used for enabling and disabling mappings of the virtualized kernel (guest OS).

The disclosed system quickly enables and disables guest kernel mappings by keeping these mappings as valid mappings in the TLB even when they are not needed. Instead the mappings are quickly activated or deactivated by modifying a register.

The number of TLB entries used is reduced by ensuring that an entry mapping a guest kernel page is valid irrespective of which of the guest's applications has invoked the virtual kernel. The number of TLB entries used is also reduced by enabling the guest kernel to share an application's TLB entries. However, a particular guest's mapping, either kernel or application, may only be valid during the execution of that particular guest's virtual machine (VM), it must be inactive if a different VM is executing. Furthermore, a particular application's mappings may only be valid when that is the active application in the guest OS.

A globally unique ASID value is associated with each guest application. No two applications share the same ASID, even if they reside in different VMs. If all of the ASIDs are used (e.g., 256), ASID preemption and recycling may be used. Guest kernels are not assigned an ASID, instead their mappings are marked global, meaning they are valid for all ASIDs.

Domain IDs are used to ensure that a guest OS's mappings are only active when that guest OS is executing. A unique domain ID is associated with each VM, and all guest OS page table entries are tagged with that domain ID, thereby tagging the TLB entries mapping the guest's kernel pages with that domain value. All other mappings are tagged with a pre-defined domain ID such as zero. However, a person of ordinary skill in the art will readily appreciate that any domain ID may be used. No two VMs share the same domain ID. If all of the domain IDs are used (e.g., 16), domain ID preemption and recycling may be used.

FIG. 6 illustrates an example of how the various tags (ASID, DID, global bit, kernel bit) are assigned, and also shows the pre-computed DACR value associated with each shadow page table. This assignment allows the disclosed system to activate and deactivate memory mappings quickly by loading a small number of registers with pre-computed values. Specifically, when the VM is executing in virtual user mode, the DACR has domain zero enabled, all other domains disabled. Thus, only the application's mappings (the ones with the matching ASID) are active.

When an application in the VM calls the guest OS, the guest OS enters virtual kernel mode. As illustrated in FIG. 7, the hypervisor changes the DACR, enabling the particular VM's domain (in addition to domain 0). This makes the guest kernel's mappings active and allows the guest kernel to access its own virtual memory as well as the application's virtual memory. The DACR value for the guest kernel is typically pre-computed and stored as part of the virtual machine state.

When the guest OS switches from one of its applications to another one of its applications, the guest OS does so by updating the virtual page table pointer. As illustrated in FIG. 8, the hypervisor virtualizes this and updates the ASID register with the value corresponding to the target application. The hypervisor also updates the physical page table pointer to point to the shadow page table belonging to that application space.

As illustrated in FIG. 9, when the guest kernel returns to user mode, the hypervisor resets the DACR to only domain zero being enabled. The hypervisor thereby de-activates the guest kernel mappings.

As illustrated in FIG. 10, when the hypervisor switches between virtual machines (world switch), the hypervisor loads the DACR either with the value enabling only domain zero (if the VM is in virtual user mode) or the one enabling also the domain associated with the VM. The hypervisor also loads the ASID register and physical page table pointer to point to the shadow page table associated with the appropriate application.

As illustrated in FIG. 11, the shadow page tables are kept consistent with the guest page tables by hiding all this machinery behind the abstraction of a virtual memory-management unit (MMU). This includes a pre-defined page table format (possibly, but not necessarily, the same as the native PT format of the processor), a page table pointer which tells the virtual hardware PT walker where to start, and a TLB that is a cache of memory mappings. Unlike a physical TLB, the virtual TLB is of an arbitrary size, so it rarely loses mappings and therefore avoids expensive misses on mappings replaced by mappings inserted later.

Address-space mappings are defined by setting up entries in the page table. The page table walker will find them and insert them into the TLB on demand. Removing or changing a memory mapping uses an explicit flush operation to invalidate any TLB entry that may contain the mapping.

The virtual TLB is represented by shadow page tables. Entries in the virtual TLB are added either by the guest OS performing an explicit TLB insert or by the hypervisor performing a virtual page table walk at page fault time. Optionally, the hypervisor can eagerly create shadow page table entries from the guest page table, for example when the guest sets the virtual page table pointer to a new page table. Entries are removed (or invalidated) when the guest OS explicitly flushes them from the virtual TLB. Shadow page-table entries may also be removed when the virtual TLB is full.

As illustrated in FIG. 12, a flush operation may be targeted at a specific entry, a particular application's address space, or the whole virtual TLB. When the flush operation is targeted at a specific entry, the hypervisor invalidates that entry in the shadow page table and also flushes it from the physical TLB. When the flush operation is targeted at a particular application's address space, the hypervisor invalidates or removes a complete shadow page table and flushes the corresponding ASID from the physical TLB. When the flush operation is targeted at the whole virtual TLB, the hypervisor invalidates or removes all of the shadow page tables belonging to the VM that is performing the flush. This operation includes the guest OS's shadow page tables that belong to the particular VM and includes an appropriate flush of the physical TLB.

Some processors using the ARM architecture use dual page table pointers. This allows splitting the page table into two parts, one mapping the lower part and the other mapping the upper part of the address space. A boundary between the two parts may be configured through an MMU register. Each part has its own page table, which is pointed to by two separate page table registers, ttbt0 and ttbr1.

Native operating systems typically use these separate parts of memory to keep kernel and user page tables separate. The OS is typically allocated in the top of the address space and uses the ttbr1 page table pointer. Applications typically use the lower part of the address space, as illustrated in FIG. 13. On a context switch, the OS points ttbr0 to the new program's page table, and leaves ttbr1 unmodified.

This approach has a performance benefit. When a user process is created, the kernel part of the L1 page table would normally have to be filled with pointers to the already existing kernel L2 page tables. This step is not required in the dual page table scheme, as the kernel page tables are kept separate.

This method also saves memory. With a single page table (containing user and kernel mappings), each application requires a full-size L1 page table (e.g., 16KiB on ARMv6). With the dual page table pointers, this is reduced as the kernel page table is always the same, and a smaller L1 page table suffices for each user process. In the typical case that the address-space is split half-half between user and kernel, the memory savings are e.g., 8KiB per application. In fact, the savings can be more. If an application is known to require less address space, an even smaller L1 page table can be used.

The hypervisor may achieve similar performance and memory benefits to the ones described above by employing a virtual MMU that supports two page table pointers and a configurable boundary between the virtual user and kernel page tables. The present system presents two virtual page table pointers to the guest OS, and makes use of the two physical page table pointers in the shadow page tables. Maintenance of the shadow page tables work as described above, except that the virtual kernel-user boundary determines whether an entry is inserted into the user or kernel shadow page table.

More specifically, guest kernel entry (described above with reference to FIG. 7) and guest kernel exit (described above with reference to FIG. 9) are essentially unaffected by the use of dual page table pointers. The virtualized PT pointer update (described above with reference to FIG. 8) works as described above if the guest OS changes the virtual ttbr0. However, if the guest OS changes the virtual ttbr1, the system removes the guest OS shadow page table and flushes the guest OS mappings from the TLB.

The world switch (described above with reference to FIG. 10) sets ttbr0 to point to the application's shadow page table (as described above). However, in addition a world switch sets ttbr1 to point to the guest kernel shadow page table (obtained from the VM context).

The operation described with reference to FIG. 11 continues to operate as described above, except that the fault address is compared to the virtual user-kernel boundary to determine which guest page table (user or kernel) to traverse, and which shadow PT to update.

The operation described with reference to FIG. 12 continues to operate as described above, except that when flushing an individual mapping, the address (compared to the virtual user-kernel boundary) determines from which shadow page table the entry is removed. In addition, when flushing a whole address space, only the user shadow page table is removed. Still further, when flushing the whole TLB, removing all shadow page tables means removing all user shadow page tables plus the kernel shadow page table for the particular VM.

In summary, persons of ordinary skill in the art will readily appreciate that methods and apparatus for fast context switching in a virtualized system have been disclosed. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A method of context switching in a virtualized system, the virtualized system having a plurality of globally unique domain identifiers, a plurality of different virtual machines, a plurality of translation lookaside buffer entries that control access to a memory, a plurality of globally unique application-space identifiers, a plurality of guest applications, and a domain access control register, the method comprising:

associating a first domain identifier from the plurality of globally unique domain identifiers with a first virtual machine from the plurality of different virtual machines and associating a second domain identifier from the plurality of globally unique domain identifiers with a second virtual machine from the plurality of different virtual machines, wherein a third, predefined domain identifier from the plurality of globally unique domain identifiers is unassociated with any one virtual machine, wherein each domain identifier is different from every other domain identifier in the virtualized system, and wherein the domain access control register specifies whether translation lookaside buffer entries tagged with one of the domain identifiers are active;

associating the plurality of globally unique application-space identifiers with the plurality of guest applications, wherein each application-space identifier is different from every other application-space identifier in the virtualized system, and wherein the plurality of guest applications reside in different virtual machines from the plurality of different virtual machines;

conditioned upon a virtual user mode being active, switching from the first virtual machine to the second virtual machine by loading the third, predefined domain identifier into the domain access control register; and conditioned upon a virtual kernel mode being active, switching from the first virtual machine to the second virtual machine by loading the second domain identifier into the domain access control register.

2. The method of claim 1, including switching from one guest application in the plurality of guest applications to another guest application in the plurality of guest applications by updating at least one register associated with the plurality of globally unique application-space identifiers.

3. The method of claim 2, wherein the at least one register associated with the plurality of globally unique domain identifiers includes at least a first memory management unit register, and the at least one register associated with the plurality of globally unique application-space identifiers includes at least a second different memory management unit register.

4. The method of claim 1, wherein the plurality of globally unique domain identifiers are used to ensure that each guest operating system in a plurality of guest operating systems in the virtualized system has memory mappings that are only active when the guest operating system is executing.

5. The method of claim 1, wherein the first domain identifier and the second domain identifier are used to map a first guest operating system and a second guest operating system, respectively, in a plurality of guest operating systems in the virtualized system with pages associated with the respective domain identifier.

6. The method of claim 1, wherein a plurality of memory mappings are associated with a domain identifier from the plurality of globally unique domain identifiers indicative of virtually privileged memory access.

7. The method of claim 1, wherein a virtual memory management unit is configured to support two virtual page table pointers and a configurable boundary between a virtual user page table and a virtual kernel page table.

8. The method of claim 7, including presenting the two virtual page table pointers to a guest operating system in the virtualized system, and associating two physical page table pointers with the two virtual page table pointers.

9. The method of claim 1, including executing the plurality of guest applications on an electronic device.

10. The method of claim 1, including, conditioned upon the virtual kernel mode being active, switching from the first virtual machine to the second virtual machine by loading the second domain identifier and the third, predefined domain identifier into the domain access control register.

11. A virtualized system having a plurality of globally unique domain identifiers, a plurality of different virtual machines, a plurality of translation lookaside buffer entries, a plurality of globally unique application-space identifiers, a plurality of guest applications, and a domain access control register, the virtualized system comprising:

a processor; and a memory operatively coupled to the processor, the plurality of translation lookaside buffer entries controlling access to the memory, wherein the processor:

associates a first domain identifier from the plurality of globally unique domain identifiers with a first virtual machine from the plurality of different virtual machines and associates a second domain identifier from the plurality of globally unique domain identifiers with a second virtual machine from the plurality of different virtual machines, wherein a third, predefined domain identifier from the plurality of globally unique domain identifiers is unassociated with any one virtual machine, wherein each domain identifier is different from every other domain identifier in the virtualized system, and wherein the domain access control register specifies whether translation lookaside buffer entries tagged with one of the domain identifiers are active; associates the plurality of globally unique application-space identifiers with the plurality of guest applications, wherein each application-space identifier is different from every other application-space identifier in the virtualized system, and wherein the plurality of guest applications reside in different virtual machines from the plurality of different virtual machines;

conditioned upon a virtual user mode being active, switches from the first virtual machine to the second virtual machine by loading the third, predefined domain identifier into the domain access control register; and conditioned upon a virtual kernel mode being active, switches from the first virtual machine to the second virtual machine by loading the second domain identifier into the domain access control register.

12. The virtualized system of claim 11, wherein the processor switches from one guest application in the plurality of guest applications to another guest application in the plurality of guest applications by updating at least one register associated with the plurality of globally unique application-space identifiers.

13. The method of claim 12, wherein the at least one register associated with the plurality of globally unique domain identifiers includes at least a first memory management unit register, and the at least one register associated with the plurality of globally unique application-space identifiers includes at least a second different memory management unit register.

14. The virtualized system of claim 11, wherein the plurality of globally unique domain identifiers are used to ensure that each guest operating system in a plurality of guest operating systems in the virtualized system has memory mappings that are only active when the guest operating system is executing.

15. The virtualized system of claim 11, wherein the first domain identifier and the second domain identifier are used to map a first guest operating system and a second guest operating system, respectively, in a plurality of guest operating systems in the virtualized system with pages associated with the respective domain identifier.

16. The virtualized system of claim 11, wherein a plurality of memory mappings are associated with a domain identifier from the plurality of globally unique domain identifiers indicative of privileged memory access.

17. The virtualized system of claim 11, wherein a virtual memory management unit is configured to support two virtual page table pointers and a configurable boundary between a virtual user page table and a virtual kernel page table.

18. The virtualized system of claim 17, wherein the processor presents the two virtual page table pointers to a guest operating system in the virtualized system, and associates two physical page table pointers with the two virtual page table pointers.

19. The virtualized system of claim 11, wherein the processor executes the plurality of guest applications on an electronic device.

20. The virtualized system of claim 11, wherein the processor, conditioned upon the virtual kernel mode being active, switches from the first virtual machine to the second virtual machine by loading the second domain identifier and the third, predefined domain identifier into the domain access control register.

21. A computer readable storage device for context switching in a virtualized system, the virtualized system having a plurality of globally unique domain identifiers, a plurality of different virtual machines, a plurality of translation lookaside buffer entries that control access to a memory, a plurality of globally unique application-space identifiers, a plurality of guest applications, and a domain access control register, the computer readable storage device storing a software program structured to cause a processor to:

associate a first domain identifier from the plurality of globally unique domain identifiers with a first virtual machine from the plurality of different virtual machines and associate a second domain identifier from the plurality of globally unique domain identifiers with a second virtual machine from the plurality of different virtual machines, wherein a third, predefined domain identifier from the plurality of globally unique domain identifiers is unassociated with any one virtual machine, wherein each domain identifier is different from every other domain identifier in the virtualized system, and wherein the domain access control register specifies whether translation lookaside buffer entries tagged with one of the domain identifiers are active;

associate the plurality of globally unique application-space identifiers with the plurality of guest applications, wherein each application-space identifier is different from every other application-space identifier in the virtualized system, and wherein the plurality of guest applications reside in different virtual machines from the plurality of different virtual machines;

conditioned upon a virtual user mode being active, switch from the first virtual machine to the second virtual machine by loading the third, predefined domain identifier into the domain access control register; and conditioned upon a virtual kernel mode being active, switch from the first virtual machine to the second virtual machine by loading the second domain identifier into the domain access control register.

22. The computer readable storage device of claim 21, wherein the processor switches from one guest application in the plurality of guest applications to another guest application in the plurality of guest applications by updating at least one register associated with the plurality of globally unique application-space identifiers.

23. The method of claim 22, wherein the at least one register associated with the plurality of globally unique domain identifiers includes at least a first memory management unit register, and the at least one register associated with the plurality of globally unique application-space identifiers includes at least a second different memory management unit register.

24. The computer readable storage device of claim 21, wherein the plurality of globally unique domain identifiers are used to ensure that each guest operating system in a plurality of guest operating systems in the virtualized system has memory mappings that are only active when the guest operating system is executing.

25. The computer readable storage device of claim 21, wherein the first domain identifier and the second domain identifier are used to map a first guest operating system and a second guest operating system, respectively, in a plurality of guest operating systems in the virtualized system with pages associated with the respective domain identifier.

26. The computer readable storage device of claim 21, wherein a plurality of memory mappings are associated with a domain identifier from the plurality of globally unique domain identifiers indicative of privileged memory access.

27. The computer readable storage device of claim of claim 21, wherein a virtual memory management unit is configured to support two virtual page table pointers and a configurable boundary between a virtual user page table and a virtual kernel page table.

28. The computer readable storage device of claim of claim 27, wherein the processor presents the two virtual page table pointers to a guest operating system in the virtualized system, and associates two physical page table pointers with the two virtual page table pointers.

29. The computer readable storage device of claim 21, wherein the processor executes the plurality of guest applications on an electronic device.

30. The computer readable storage device of claim 21, wherein the processor, conditioned upon the virtual kernel mode being active, switches from the first virtual machine to the second virtual machine by loading the second domain identifier and the third, predefined domain identifier into the domain access control register.

* * * * *